July 17, 1928. Re. 17,039

H. L. BURKHARDT

PLANETARY GEAR MECHANISM

Original Filed May 23, 1922 3 Sheets-Sheet 1

Inventor
Harry L. Burkhardt
Kurz Hudson & Kent
Attys.

July 17, 1928. Re. 17,039
H. L. BURKHARDT
PLANETARY GEAR MECHANISM
Original Filed May 23, 1922 3 Sheets-Sheet 2
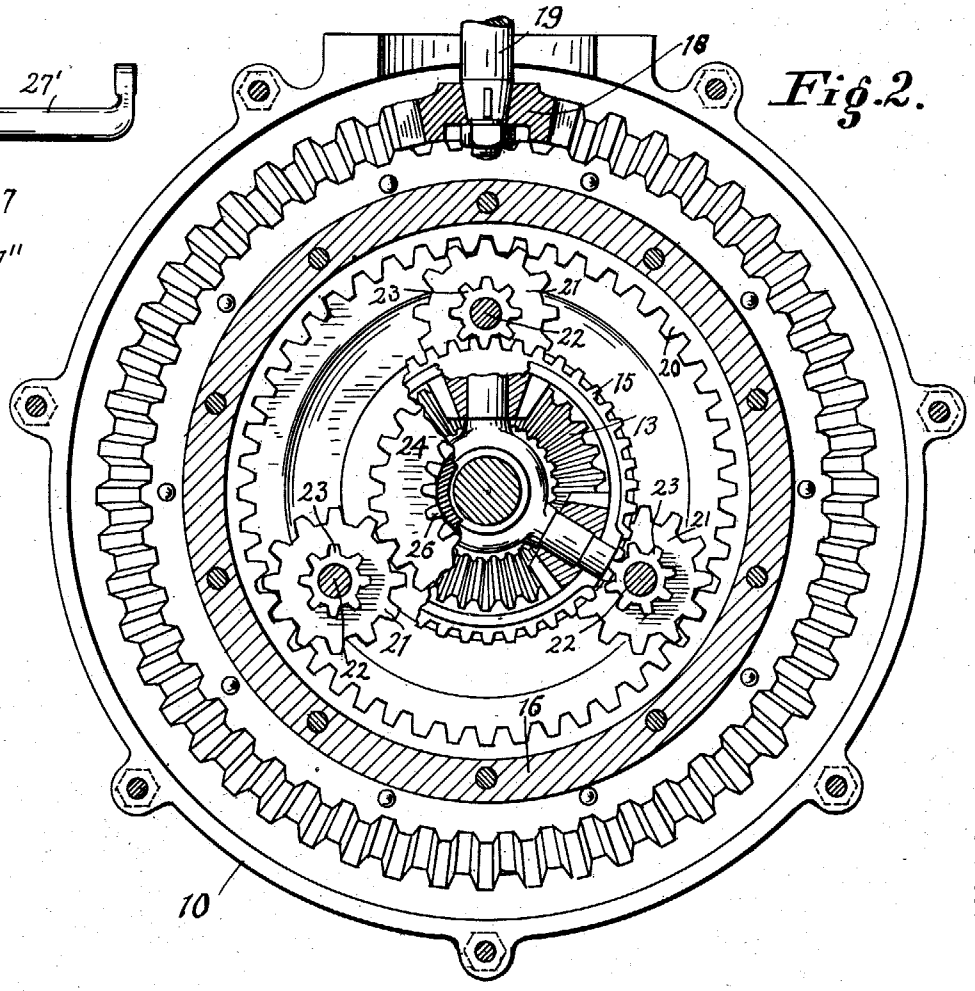
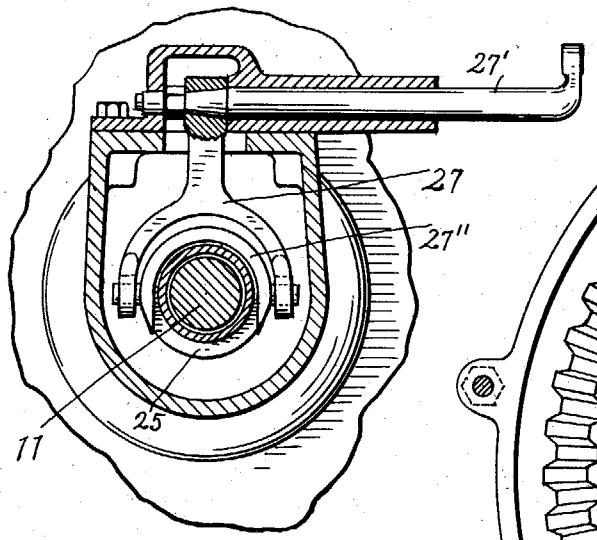
Fig. 3.
Inventor
Harry L. Burkhardt
Knox Hudson & Kent.
Attys.

July 17, 1928. Re. 17,039

H. L. BURKHARDT

PLANETARY GEAR MECHANISM

Original Filed May 23, 1922 3 Sheets-Sheet 3

Inventor

Harry L. Burkhardt.

By Kure Hudson & Kent

Attorneys

Reissued July 17, 1928. Re. 17,039

UNITED STATES PATENT OFFICE.

HARRY L. BURKHARDT, OF NEW YORK, N. Y., ASSIGNOR TO RUCKSTELL SALES & MANUFACTURING COMPANY, OF BERKELEY, CALIFORNIA, A CORPORATION OF CALIFORNIA.

PLANETARY-GEAR MECHANISM.

Original No. 1,586,944, dated June 1, 1926, Serial No. 563,064, filed May 23, 1922. Application for reissue filed August 19, 1926. Serial No. 130,328.

This invention relates to planetary gear mechanism.

Where planetary gear mechanism is interposed between the ring gear and differential casing of a rear axle, as shown, for instance, in United States Letters Patent No. 1,165,-915, issued December 28th, 1915, to Thomas H. Sparks, or in the pending application of Glover E. Ruckstell, Serial No. 545,936, filed March 23, 1922, the spider or ring which carries the planetary pinions is connected directly to the differential casing and therefore it is difficult to get as great a speed reduction as is desired in many situations. Also in the planetary mechanism as heretofore constructed considerable wear occurs on the planetary pinions and the bearings therefor owing to the use of rings or spiders.

The present invention has for its object to do away with pins, rings or cages usually employed for supporting the planetary pinions and also to obtain a greater reduction in speed between the ring gear and differential casing than has been possible to obtain heretofore. This I accomplish by so arranging the mechanism that the planetary pinions will be supported entirely by the internal toothed gear and the sun gear, and will be held in proper alignment by a second set of pinions spaced axially therefrom and moving in a similar orbit. Opposite pinions are connected by means of a spindle or shaft, which spindle or shaft carries a pinion which meshes with a gear on the driven member. By means of the gear connections between the planetary spindles and the driven member a greater reduction in speed can be obtained when the planetary pinions are functioning in low speed position.

In the accompanying drawings,

Fig. 2 shows a cross section of the device shown in Fig. 1.

Fig. 3 shows a sectional view through a portion of the axle illustrating the control means.

Figure 1:
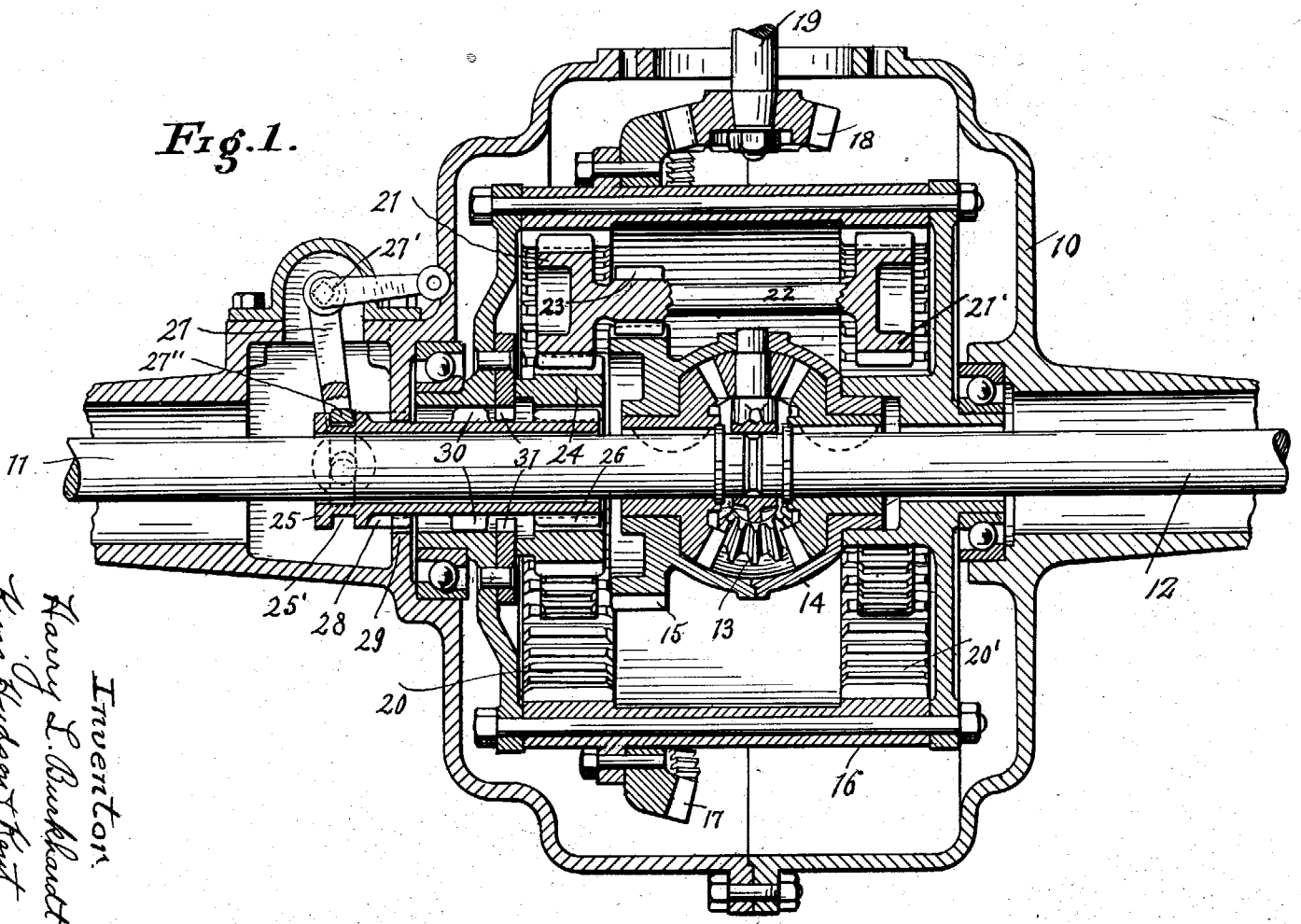
Fig. 1 shows a longitudinal sectional view of the mechanism applied to the rear axle of an automobile.

Describing in detail the form shown in Figs. 1 and 2, an axle housing is indicated at 10, within which are axle shafts 11 and 12 which are connected together by the usual differential mechanism 13. The differential casing is indicated at 14 and is fitted at one side with a driven gear 15.

A housing 16 includes the planetary mechanism presently to be described, and fixed upon the housing 16 is a ring gear 17 which is driven by a level pinion 18 on a shaft 19. This housing carries within it at each side of the differential casing internal gears 20 and 20′. Meshing with the internal gear 20, at equally spaced points, is a plurality of planetary pinions 21, and meshing with the internal gear 20′ is a plurality of pinions 21′ which are equally spaced and aligned with the pinions 21, opposite pinions being connected across by a shaft or axle 22. Fived upon each shaft or axle 22 intermediate the ends thereof is a pinion 23 meshing with the gear 15 on the differential casing.

The planetary pinions 21 also mesh with a sun gear 24. Since there is no sun gear meshing with the other set of pinions 21′, the latter in reality constitute balancing or aligning pinions.

The sun gear 24 is in the form of a ring gear and is supported upon a clutch sleeve 25 slidably mounted on one of the axle shafts and having teeth 26 to engage with clutch teeth on the inner circumference of the sun gear 24. This clutch sleeve is controlled by a shifting fork 27 which is carried by the shaft 27′ and, in turn, carries a yoke 27″ which is arranged in a groove 25′ in the sleeve 25. The sleeve 25 is also provided with teeth 28 to lock with a plate 29 on the axle housing when in the position shown in Fig. 1, whereby to hold the sun gear against turning. This will cause the planetary pinions to revolve around the sun gear and transmit a reduced speed to the differential casing. When the sleeve 25 is shifted to the left, the teeth 26 on the clutch sleeve will, without entirely disengaging the internal teeth on the sun gear 24, lock with a plate 31 on the planetary housing 16 and thus cause the planetary mechanism to rotate as a unit and drive the differential housing at a direct or high speed, it being understood that the teeth 28 have meantime been released from the teeth 29. In between the locking positions the sleeve 25 is free to rotate and thereby to permit the planetary mechanism to assume a neutral or non-driving position. Members 30 are provided upon the sleeve 25 to support the same in the hub of the housing 16. These members are preferably in the form of ribs or teeth, corresponding with the teeth 26, to facilitate insertion of the sleeve through the toothed opening in the end plate 29 of the axle housing.

Figure 4:
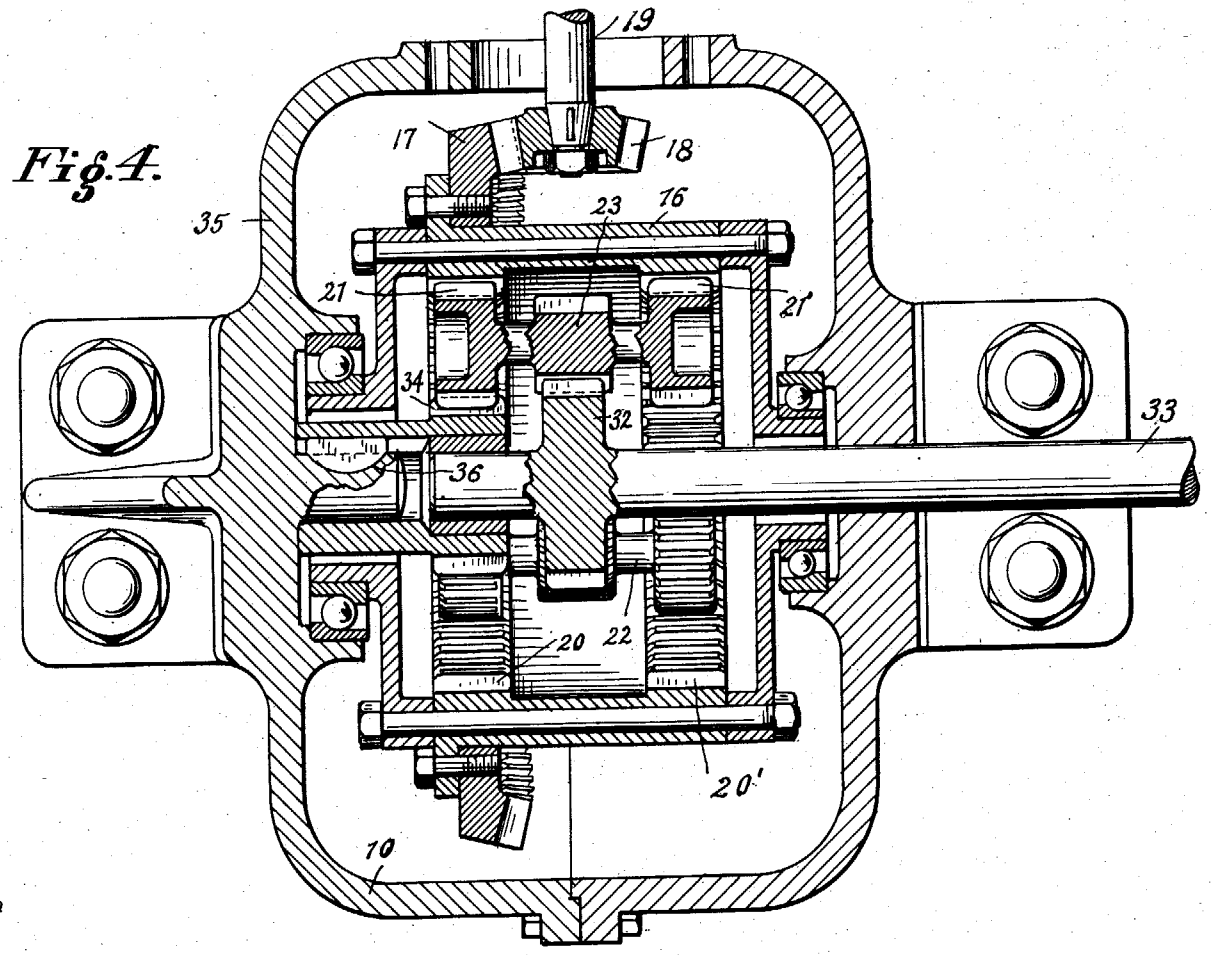
Fig. 4 shows a longitudinal sectional view of the mechanism for general purposes.

In Fig. 4 I show the planetary mechanism separate from the rear axle or differential. A driven gear 32, fixed upon a driven shaft 33, is substituted for the differential and axle shafts. The clutch sleeve for controlling the motion of the sun gear is also omitted in this form, and the sun gear 34 is non-rotatably secured to the stationary housing 35 by the key 36, so that the device functions merely as a reduction gearing between the ring gear 17 and driven gear 32.

An important feature of this invention is a planetary gear set in which it is unnecessary to carry the planet pinions on cages or rings of their own. In prior planetary gear sets there has been required a cage or carrier of some nature upon which the planet pinions rotate and to which they transmit their motion. The planet pinions in the present instance require no bearings, since they are supported between the outer internal gears and the center or sun gear, both of which rotate upon a common axis. The two internal gears 20 and 20′ must be fixed with relation to each other, in order that the axes of the planetary pinions may be held parallel with the common axis of the gear set.

This construction also makes it possible to obtain greater speed reduction than in cases where the planetary pinions are carried on a ring or spider and the latter connected directly to the driven member, as in prior devices. The pinions on the spindles of the planetary pinions, which mesh with the driven gear, will, when the device is in low speed position, bring about a reduction in speed between the planetary pinions and the driven member. This reduction may be obtained in any desired amount by proportioning the sizes of the pinions 23 and driven gear 32.

Various changes in the construction and arrangement of the several parts herein shown and described may be employed without departing from the spirit of the invention as disclosed in the appended claims.

Having thus described my invention, I claim:

1. In combination with a rear axle having a differential mechanism, a gear on the casing of the differential mechanism, a rotatable housing enclosing said differential mechanism, a ring gear for driving said housing, and planetary mechanism interposed between the ring gear and the gear on the differential casing, said planetary mechanism comprising an internal gear driven by the ring gear, a set of planetary pinions meshing with the internal gear, an axle for each of the planetary pinions, means for maintaining said axles in parallel relation, a pinion on each axle meshing with said gear on the differential casing, and a sun gear meshing with said planetary pinions, and means for controlling the operation of the sun gear to vary the action of the planetary pinions.

2. In combination with a driving and a driven member, a planetary mechanism operatively connecting said members and comprising a pair of aligned internal gears on one of said members in axially spaced arrangement, an external gear on the other of said members coaxial with said internal gears and arranged between the latter, three coaxial rigidly connected planetary gears meshing, respectively, with said internal and said external gears and entirely supported thereby, another gear meshing with one of said planetary gears, means for locking the last-mentioned gear to one of said members to rotate therewith, means for holding the last-mentioned gear from rotation with said members, and means whereby said members are supported for relative rotation.

3. In combination with a driving and a driven member, a planetary mechanism operatively connecting said members and comprising a pair of aligned gears on one of said members in axially spaced arrangement, a gear on the other of said members coaxial with the first-mentioned gears and arranged between the latter, three coaxial rigidly connected planetary gears meshing, respectively, with the first and second-mentioned gears and entirely supported thereby, another gear meshing with one of said planetary gears, means for locking the last-mentioned gear to one of said members to rotate therewith, means for holding the last-mentioned gear from rotation with said members, and means whereby said members are supported for relative rotation.

In testimony whereof, I hereunto affix my signature.

HARRY L. BURKHARDT.